(12) United States Patent
Sasaki et al.

(10) Patent No.: US 6,958,888 B2
(45) Date of Patent: Oct. 25, 2005

(54) SLIDER OF THIN-FILM MAGNETIC HEAD AND METHOD OF MANUFACTURING SAME

(75) Inventors: Yoshitaka Sasaki, Milpitas, CA (US); Takehiro Kamigama, Hong Kong (CN)

(73) Assignees: Headway Technologies, Inc., Milpitas, CA (US); SAE Magnetic (H.K.), Ltd., Hong Kong (CN)

( * ) Notice: Subject to any disclaimer, the term of this patent is extended or adjusted under 35 U.S.C. 154(b) by 42 days.

(21) Appl. No.: 10/802,848

(22) Filed: Mar. 18, 2004

(65) Prior Publication Data

US 2004/0174637 A1 Sep. 9, 2004

Related U.S. Application Data

(62) Division of application No. 09/970,786, filed on Oct. 5, 2001, now abandoned.

(51) Int. Cl.$^7$ ................................................. G11B 5/60
(52) U.S. Cl. ................................................. 360/235.1
(58) Field of Search .......................... 360/235.1, 235.2, 360/235.3, 236.1, 234.7

(56) References Cited

U.S. PATENT DOCUMENTS

| | | | | |
|---|---|---|---|---|
| 5,617,273 | A | * 4/1997 | Carr et al. | 360/234.7 |
| 5,634,259 | A | * 6/1997 | Sone et al. | 29/603.12 |
| 5,808,832 | A | * 9/1998 | Chen et al. | 360/235.2 |
| 5,841,608 | A | 11/1998 | Kasamatsu et al. | |
| 6,404,592 | B1 | * 6/2002 | Saito et al. | 360/235.2 |
| 2001/0019467 | A1 | * 9/2001 | Otsuka et al. | 360/235.2 |
| 2001/0030835 | A1 | * 10/2001 | Hipwell et al. | 360/237 |

FOREIGN PATENT DOCUMENTS

| | | |
|---|---|---|
| JP | 59-142776 | 8/1984 |
| JP | A 7-230615 | 8/1995 |
| JP | A 8-287440 | 11/1996 |
| JP | A 8-293111 | 11/1996 |
| JP | A 8-339511 | 12/1996 |
| JP | A 9-63027 | 3/1997 |
| JP | 10-326406 | * 12/1998 |
| JP | A 11-120528 | 4/1999 |
| JP | A 11-185418 | 7/1999 |

OTHER PUBLICATIONS

Machine translation of JP 09–63027, Mar. 7, 1997.*
U.S. Appl. No. 09/685,947, filed Oct. 2000, Sasaki.

* cited by examiner

*Primary Examiner*—Angel Castro
(74) *Attorney, Agent, or Firm*—Oliff & Berridge, PLC

(57) ABSTRACT

A slider comprises a substrate, a thin-film magnetic head element, an insulating portion, and a medium facing layer. The substrate has a first surface facing toward a recording medium and a second surface meeting this first surface. The first surface is located farther from the recording medium than an air bearing surface. The thin-film magnetic head element is located near the second surface of the substrate and near the air bearing surface. The insulating portion surrounds the thin-film magnetic head element and has a surface constituting a part of the air bearing surface. The medium facing layer is adjacent to the first surface of the substrate and has a surface constituting another part of the air bearing surface. The substrate has a hardness greater than that of the insulating portion. As the substrate and the medium facing layer are compared in hardness, the medium facing layer has a hardness closer to that of the insulating portion.

5 Claims, 15 Drawing Sheets

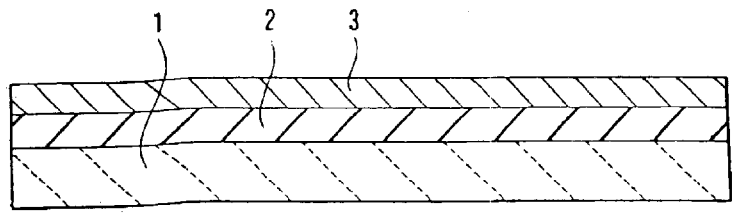
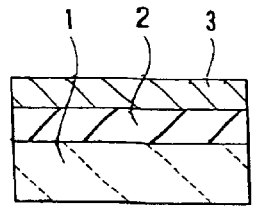
FIG. 1A  FIG. 1B
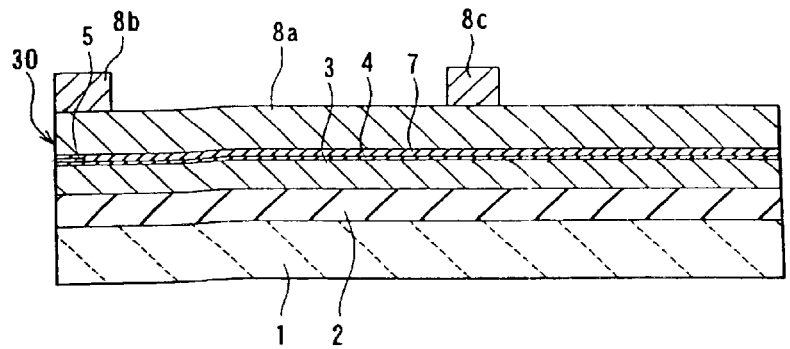
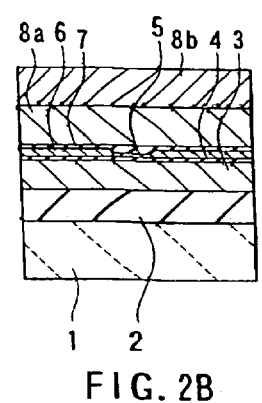
FIG. 2A  FIG. 2B
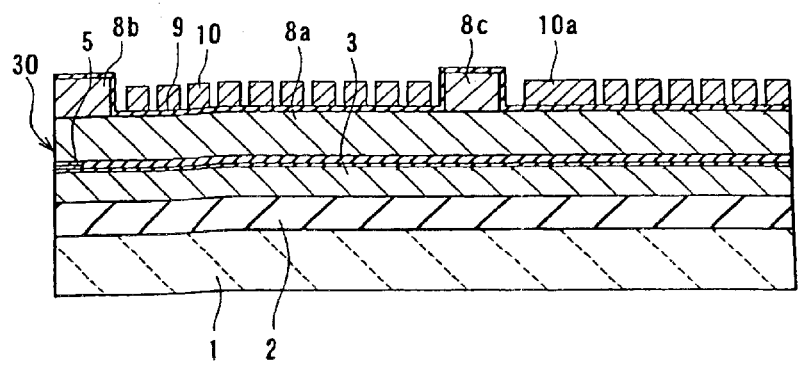
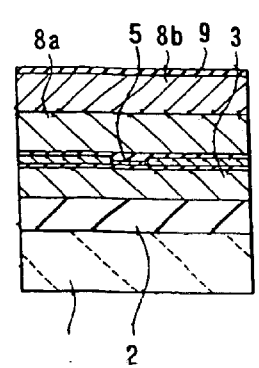
FIG. 3A  FIG. 3B

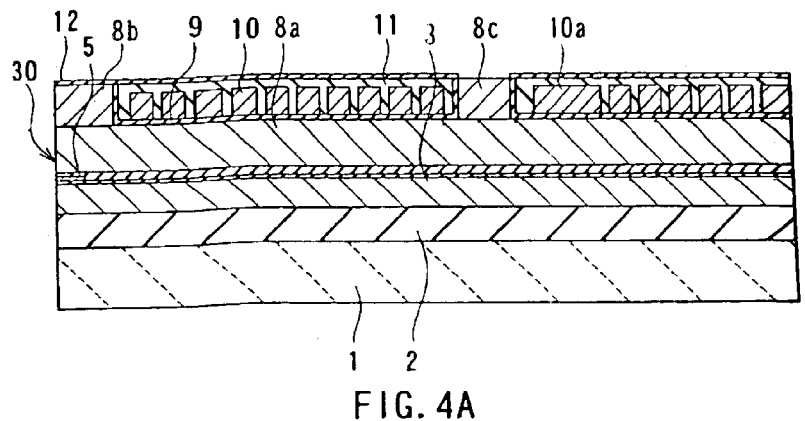 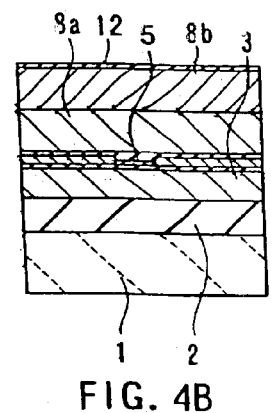
FIG. 4A   FIG. 4B
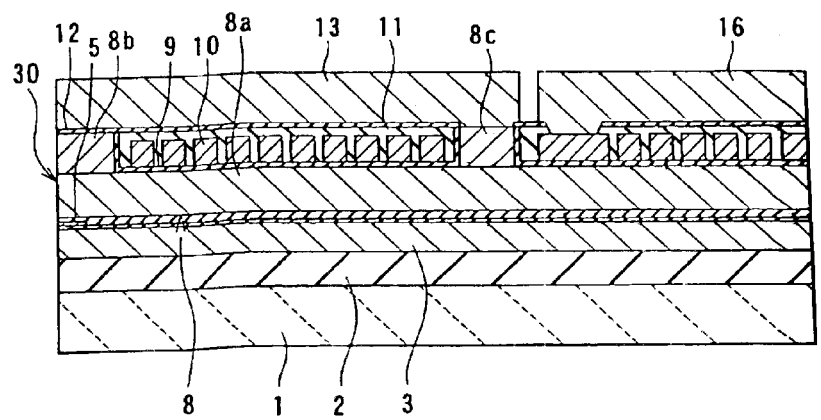 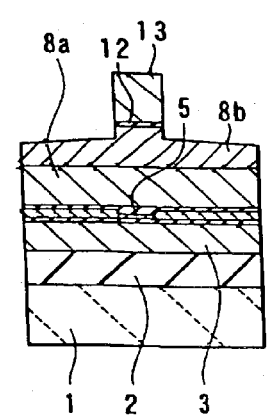
FIG. 5A   FIG. 5B

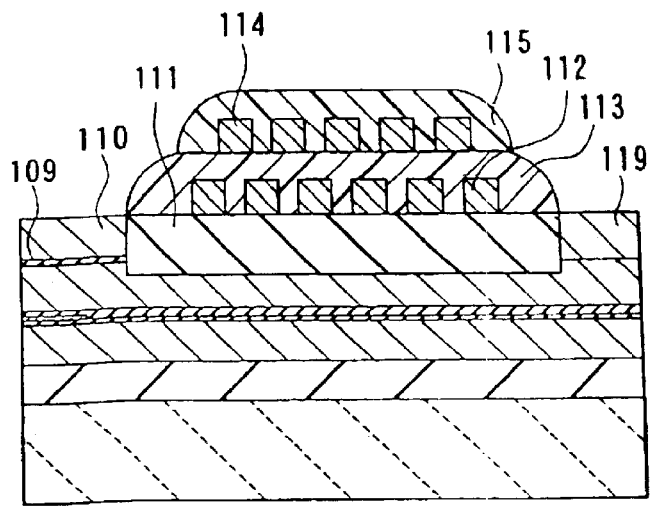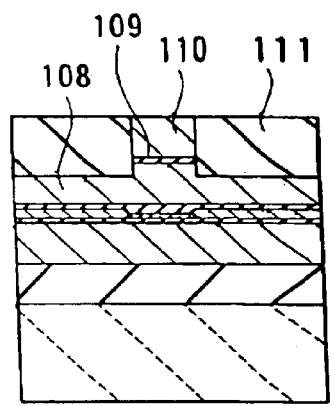
FIG. 23A
RELATED ART
FIG. 23B
RELATED ART
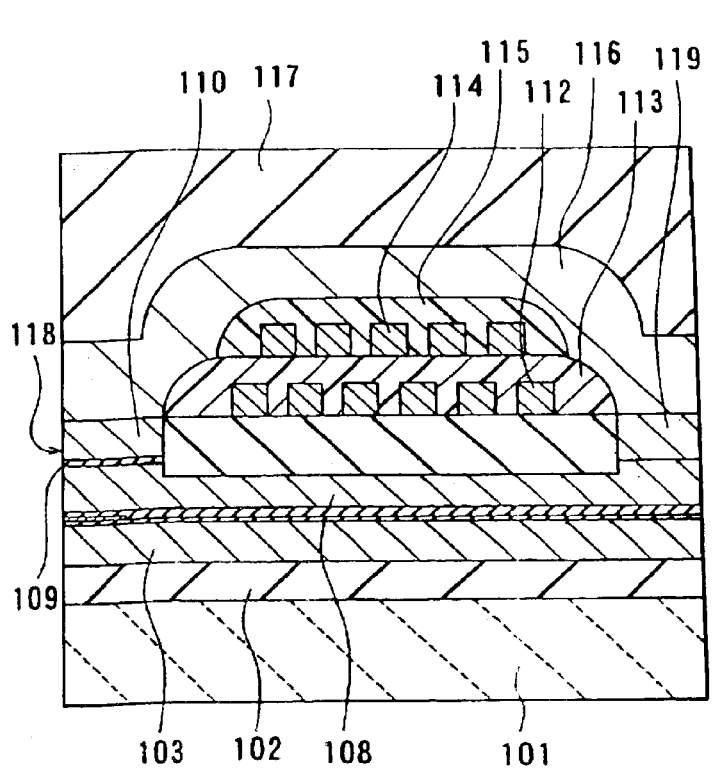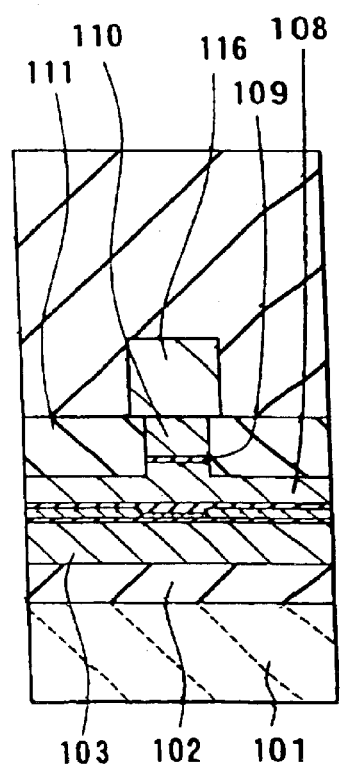
FIG. 24A
RELATED ART
FIG. 24B
RELATED ART

SLIDER OF THIN-FILM MAGNETIC HEAD AND METHOD OF MANUFACTURING SAME

This is a division of application Ser. No. 09/970,786 filed Oct. 5, 2001 now abandoned. The entire disclosure of the prior application is hereby incorporated by reference herein in its entirety.

BACKGROUND OF THE INVENTION

1. Field of the Invention

The present invention relates to a slider of a thin-film magnetic head which comprises a medium facing surface that faces toward a recording medium and a thin-film magnetic head element located near the medium facing surface, and to a method of manufacturing such a slider.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head where areal density is more than 1 gigabit per square inch. A GMR head is used as a reproducing head where areal density is more than 3 gigabits per square inch. It is GMR heads that have been most widely used recently.

The performance of the reproducing head is improved by replacing the AMR film with a GMR film and the like having an excellent magnetoresistive sensitivity. Alternatively, a pattern width such as the reproducing track width and the MR height, in particular, may be optimized. The MR height is the length (height) between an end of the MR element located in the air bearing surface and the other end. The air bearing surface is a surface of the thin-film magnetic head facing toward a magnetic recording medium.

Performance improvements in a recording head are also required as the performance of a reproducing head is improved. It is required to increase the linear density in order to increase the areal density among the performance characteristics of the recording head. To achieve this, it is required to implement a recording head of a narrow track structure wherein the width of top and bottom poles sandwiching the recording gap layer on a side of the air bearing surface is reduced down to microns or a submicron order. Semiconductor process techniques are utilized to implement such a structure. A pattern width, such as the throat height in particular, is also a factor that determines the recording head performance. The throat height is the length (height) of pole portions, that is, portions of magnetic pole layers facing each other with a recording gap layer in between, between the air-bearing-surface-side end and the other end. A reduction in throat height is desired in order to improve the recording head performance. The throat height is controlled by an amount of lapping when the air bearing surface is processed.

As thus described, it is important to fabricate well-balanced recording and reproducing heads to improve the performance of the thin-film magnetic head.

In order to implement a thin-film magnetic head that achieves high recording density, the requirements for the reproducing head include a reduction in reproducing track width, an increase in reproducing output, and a reduction in noise. The requirements for the recording head include a reduction in recording track width, an improvement in overwrite property that is a parameter indicating one of characteristics when data is written over existing data, and an improvement in nonlinear transition shift.

In general, a flying-type thin-film magnetic head used in a hard disk device and the like is made up of a slider, a thin-film magnetic head element being formed at the trailing edge of the slider. The slider slightly flies over a recording medium by means of the airflow generated by the rotation of the medium.

Reference is now made to FIG. 21A to FIG. 24A, FIG. 21B to FIG. 24B, and FIG. 25 to describe an example of a method of manufacturing a related-art thin-film magnetic head element. FIG. 21A to FIG. 24A are cross sections each orthogonal to the air bearing surface. FIG. 21B to FIG. 24B are cross sections of the pole portion each parallel to the air bearing surface.

According to the manufacturing method, as shown in FIG. 21A and FIG. 21B, an insulating layer 102 made of alumina ($Al_2O_3$), for example, having a thickness of about 5 to 10 $\mu$m, is deposited on a substrate 101 made of aluminum oxide and titanium carbide ($Al_2O_3$—TiC), for example. Next, on the insulating layer 102, a bottom shield layer 103 made of a magnetic material is formed for a reproducing head.

Next, a bottom shield gap film 104 made of an insulating material such as alumina and having a thickness of 100 to 200 nm, for example, is formed through sputtering on the bottom shield layer 103. On the bottom shield gap film 104, an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 made of an insulating material such as alumina is formed through sputtering, for example, on the bottom shield gap film 104, the MR element 105 and the electrode layers 106. The MR element 105 is embedded in the shield gap films 104 and 107.

Next, on the top shield gap film 107, a top shield-layer-cum-bottom-pole-layer (called a bottom pole layer in the following description) 108 is formed to a thickness of about 3 $\mu$m. The bottom pole layer 108 is made of a magnetic material and used for both the reproducing head and the recording head.

Next, as shown in FIG. 22A and FIG. 22B, a recording gap layer 109 made of an insulating film such as an alumina film and having a thickness of 0.2 $\mu$m is formed on the bottom pole layer 108. Next, the recording gap layer 109 is partially etched to form a contact hole 109a for making a magnetic path. Next, a top pole tip 110 for the recording head is formed on the recording gap layer 109 in the pole portion. The top pole tip 110 is made of a magnetic material and has a thickness of 0.5 to 1.0 $\mu$m. At the same time, a magnetic layer 119 made of a magnetic material is formed for making the magnetic path in the contact hole 109a for making the magnetic path.

Next, as shown in FIG. 23A and FIG. 23B, the recording gap layer 109 and the bottom pole layer 108 are etched through ion milling, using the top pole tip 110 as a mask. As shown in FIG. 23B, the structure is called a trim structure wherein the sidewalls of the top pole portion (the top pole tip 110), the recording gap layer 109, and a part of the bottom pole layer 108 are formed vertically in a self-aligned manner.

Next, an insulating layer 111 of alumina, for example, having a thickness of about 3 µm is formed over the entire surface. The insulating layer 111 is polished to the surfaces of the top pole tip 110 and the magnetic layer 119 and flattened.

On the flattened insulating layer 111 a first layer 112 of a thin-film coil, made of copper (Cu), for example, is formed for the induction-type recording head. Next, a photoresist layer 113 is formed into a specific shape on the insulating layer 111 and the first layer 112 of the coil. Heat treatment is performed at a specific temperature to flatten the surface of the photoresist layer 113. Next, a second layer 114 of the thin-film coil is formed on the photoresist layer 113. Next, a photoresist layer 115 is formed into a specific shape on the photoresist layer 113 and the second layer 114 of the coil. Heat treatment is performed at a specific temperature to flatten the surface of the photoresist layer 115.

Next, as shown in FIG. 24A and FIG. 24B, a top pole layer 116 for the recording head is formed on the top pole tip 110, the photoresist layers 113 and us and the magnetic layer 119. The top pole layer 116 is made of a magnetic material such as Permalloy (NiFe). Next, an overcoat layer 117 of alumina, for example, is formed to cover the top pole layer 116. Finally, machine processing of the slider including the forgoing layers is performed to form the air bearing surface 118 of the recording head and the reproducing head. The thin-film magnetic head element is thus completed.

FIG. 25 is a top view of the thin-film magnetic head element shown in FIG. 24A and FIG. 24B. The overcoat layer 117 and the other insulating layers and films are omitted in FIG. 25.

Reference is now made to FIG. 26 to FIG. 28 to describe the configuration of the slider and a method of manufacturing the same. FIG. 26 is a bottom view that illustrates example of the configuration of the air bearing surface of the slider. As shown, the air bearing surface of the slider 120 is shaped such that the slider 120 slightly flies over a recording medium such as a magnetic disk by means of the airflow generated by the rotation of the medium. In FIG. 26 numeral 121a indicates a convex portion and numeral 121b indicates a concave portion. A thin-film magnetic head element 122 is located near the air-outflow-side end of the air bearing surface of the slider 120 (that is, on the upper side of FIG. 26). The configuration of the head element 122 is as shown in FIG. 24A and FIG. 24B, for example. Portion A of FIG. 26 corresponds to FIG. 24B.

The slider 120 is fabricated as follows. A wafer includes a plurality of rows of portions to be sliders (hereinafter called slider portions) each of which includes the thin-film magnetic head element 122. This wafer is cut in one direction to form blocks called bars each of which includes a row of slider portions. Each of the bars is then lapped to form the air bearing surface. Furthermore, the convex portions 121a and the concave portion 121b are formed. Each of the bars is then divided into sliders 120.

FIG. 27 is a cross-sectional view taken along line 27—27 of FIG. 26. FIG. 27 illustrates only the main part of the thin-film magnetic head element 122. As shown in FIG. 27, the greater part of the slider 120 is made up of the substrate 101 of aluminum oxide and titanium carbide, for example. The rest of the slider 120 is made up of the insulating layer 127 of alumina, for example, and the head element 122 and soon formed in the insulating layer 127. The greater part of the insulating layer 127 is the overcoat layer 117.

As disclosed in Published Unexamined Japanese Patent Application Hei 9-63027 (1997), for example, a protection film of a material such as diamond-like carbon (DLC) may be formed on the air bearing surface of the slider 120 in order to prevent corrosion, for example, of the bottom shield layer 103, the bottom pole layer 108, the top pole tip 110, and the top pole layer 116 and so on. FIG. 28 is a cross-sectional view that illustrates the slider 120 with a protection film 128 formed on the air bearing surface, the slider 120 slightly flying over a recording medium 140.

In order to improve the performance characteristics of a hard disk device, such as areal recording density, a method of increasing linear recording density and a method of increasing track density may be taken. To design a high-performance hard disk device, specific measures taken for implementing the recording head, the reproducing head or the thin-film magnetic head as a whole depend on whether linear recording density or track density is emphasized. That is, if priority is given to track density, a reduction in track width is required for both recording head and reproducing head, for example.

If priority is given to linear recording density, it is required for the reproducing head to improve the reproducing output and to reduce a shield gap length, that is, the distance between the bottom shield layer and the top shield layer. Moreover, it is required to reduce the distance between the recording medium and the thin-film magnetic head element (hereinafter called a magnetic space).

A reduction in magnetic space is achieved by reducing the amount of flying of the slider. A reduction in magnetic space contributes not only to an improvement in the reproducing output of the reproducing head but also to an improvement in the overwrite property of the recording head.

The following is a description of the problem that arises when the magnetic space is reduced. In the prior art, lapping of the air bearing surface of the slider 120 has been performed on a rotating tin surface plate through the use of diamond slurry, for example.

A plurality of materials that make up the slider 120 have different hardnesses. For example, a comparison is made between: aluminum oxide and titanium carbide that is a ceramic material used for the substrate 101; a magnetic material such as NiFe used for the bottom shield layer 103, the bottom pole layer 108, the top pole tip 110, the top pole layer 116 and so on; and alumina used for the insulating layer 127. The hardness of aluminum oxide and titanium carbide is the greatest while that of NiFe is the smallest. The hardness of alumina is smaller than that of aluminum oxide and titanium carbide, and greater than that of NiFe.

The slider 120 includes a plurality of layers having different hardnesses as thus described. If this slider 120 is lapped on a tin surface plate through the use of diamond slurry as an abrasive, differences in level may result among the layers having different hardnesses. For example, as shown in FIG. 27, a difference of about 1 to 2 nm in level is created between the insulating layer 127 and the top pole layer 116, for example, that is a layer made of a magnetic material such as NiFe, an end of the top pole layer 116 being located behind an end of the insulating layer 127. A difference of about 4 to 5 nm in level is created between the insulating layer 127 and the substrate 101, an end of the insulating layer 127 being located behind an end of the substrate 101. In this case, the difference in level is about 5 to 7 nm between the surface of the thin-film magnetic head element 122 closer to the air bearing surface and the surface of the substrate 101 closer to the air bearing surface, the protection film 128 being excluded.

As shown in FIG. 28, the distance between the slider 120 and the recording medium 140 when the slider 120 is flying is about 7 to 9 nm. If the protection layer 128 is provided, the distance between the recording medium 140 and the surface of the thin-film magnetic head element 122 closer to the air bearing surface increases by about 4 to 5 nm which corresponds to the thickness of the protection layer 128. In view of the foregoing, the magnetic space, that is, the distance between the medium 140 and the surface of the head element 122 closer to the air bearing surface when the slider 120 is flying, is about 15 nm. When the magnetic space is of such a degree, attainable areal density is limited to about 80 to 100 gigabits per square inch.

As thus described, the related-art thin-film magnetic head may have a difference in level in the air bearing surface of the slider 120, the portion corresponding to the head element 122 being recessed behind the other part. As a result, it is difficult to reduce the magnetic space, and to improve the recording density.

Since it is difficult to reduce the magnetic space of the related-art thin-film magnetic head as described above, it is impossible to improve the performance of the reproducing head in particular to a sufficient degree, such as an improvement in the reproducing output and a reduction in half width of the reproducing head. As a result, the problem of the related art is that the error rate of the hard disk devices for high density recording increases and the yield of the hard disk devices decreases.

In Published Unexamined Japanese Patent Application Hei 7-230615 (1995), a technique is disclosed to flatten the flying surface of the slider, wherein a protection film made of an insulating film is provided in a recess produced between the slider and the head element when the flying surface of the slider is processed. In this publication the following first and second methods are disclosed to provide the protection film in the recess. The first method is to form a protection film through sputtering over the entire surface including the flying surface of the slider and a surface of the head element located closer to the flying surface, and to lap the flying surface of the slider so as to remove a portion of the protection film on the flying surface of the slider. The second method is to form a photosensitive organic film over the entire surface including the flying surface of the slider and a surface of the head element located closer to the flying surface; then to expose only a portion of the organic film on the surface of the head element; and then to remove the portion of the organic film. A protection film is then formed over the entire surface through sputtering, and the rest of the organic film is finally removed.

Nevertheless, the technique described in Published Unexamined Japanese Patent Application Hei 7-230615 has a problem that the magnetic space cannot be reduced because the flying surface of the slider and the surface of the head element located closer to the flying surface still have a difference in level.

Furthermore, according to the related-art thin-film magnetic head, since the slider 120 includes a plurality of layers having different hardnesses, lapping of the slider 120 can cause a smear on the reproducing head, which can result in a defect in the reproducing head. Hereinafter, this problem will be described in detail.

For the purpose of reducing the half width of the reproducing output, a shield gap length that is the distance between the bottom shield layer and the top shield layer has been reduced to the order of 70 to 80 nm. The MR element 105, the electrode layers 106 connected to the MR element 105, and the shield gap films 104 and 107 sandwiching these elements from above and below are interposed between the bottom shield layer and the top shield layer. The shield gap films 104 and 107 each have a thickness of 20 to 40 nm, for example. The MR element 105 has a thickness of 30 to 35 nm, for example.

The slider 120 is lapped, with the MR element 105 the electrode layers 106, and the shield gap films 104 and 107 exposed in the air bearing surface. In the slider 120, the substrate 101 made of aluminum oxide and titanium carbide, for example, has the greatest hardness, while the magnetic layers included in the thin-film magnetic head element 122 have the smallest hardness. The insulating layer 127 made of alumina, for example, has a hardness smaller than that of the substrate 101 and greater than that of the magnetic layers. When lapping such a slider 120 including a plurality of layers having different hardnesses, the slider 120 must be lapped with a greater load applied thereto, so as to lap the hard substrate 101. Then, during the lapping of the slider 120, chippings of the electrode layers 106 made of soft metal such as Au and Cu may be jammed and spread between the air bearing surface and the surface plate, producing a defect called a smear. The smear sometimes causes an electric short circuit between the MR element 105 and the bottom shield layer or the top shield layer. The short circuit can lower the sensitivity of the reproducing head and produce noise in the reproducing output, thereby deteriorating the performance of the reproducing head.

OBJECT AND SUMMARY OF THE INVENTION

It is an object of the present invention to provide a slider of a thin-film magnetic head and a method of manufacturing the same for achieving a low-flying slider of a thin-film magnetic head, and for preventing occurrences of defects in reproducing heads due to lapping of the slider material for forming the medium facing surface.

A slider of a thin-film magnetic head according to the present invention comprises:

a medium facing surface that faces toward a recording medium;

a substrate having a first surface that faces toward the recording medium and is located farther from the recording medium than the medium facing surface; and a second surface that meets the first surface;

a thin-film magnetic head element located near the second surface of the substrate and near the medium facing surface;

an insulating portion surrounding the thin-film magnetic head element and having a surface that constitutes a part of the medium facing surface; and a medium facing layer located adjacent to the first surface of the substrate and having a surface that constitutes another part of the medium facing surface, wherein:

the substrate has a hardness greater than that of the insulating portion, and as the substrate and the medium facing layer are compared in hardness, the medium facing layer has a hardness closer to that of the insulating portion.

The slider of a thin-film magnetic head of the invention has the medium facing layer having a hardness closer to that of the insulating portion as compared with the substrate. Therefore, this slider makes it possible to prevent the occurrence of a difference in level in the medium facing surface due to lapping of the slider material for forming the medium facing surface. In addition, according to the invention, the loads to be applied to the slider material during lapping can be made smaller than in the case of no medium facing layer.

In the slider of a thin-film magnetic head of the invention, the medium facing surface may have a concavity/convexity for controlling flying of the slider over the recording medium.

In the slider of a thin-film magnetic head of the invention, the main material of the insulating portion and the material of the medium facing layer are the same. In this case, the substrate may be made mainly of aluminum oxide and titanium carbide; the insulating portion may be made mainly of alumina; and the medium facing layer may be made of alumina.

In the slider of a thin-film magnetic head of the invention, the substrate may be made mainly of aluminum oxide and titanium carbide; the insulating portion may be made mainly of alumina; and the medium facing layer may be made of diamond-like carbon.

A method according to the invention is provided for manufacturing a slider of a thin-film magnetic head, the slider comprising: a medium facing surface that faces toward a recording medium; a substrate having a first surface that faces toward the recording medium and is located farther from the recording medium than the medium facing surface; and a second surface that meets the first surface; a thin-film magnetic head element located near the second surface of the substrate and near the medium facing surface; an insulating portion surrounding the thin-film magnetic head element and having a surface that constitutes a part of the medium facing surface; and a medium facing layer located adjacent to the first surface of the substrate and having a surface that constitutes another part of the medium facing surface, wherein: the substrate has a hardness greater than that of the insulating portion, and, as the substrate and the medium facing layer are compared in hardness, the medium facing layer has a hardness closer to that of the insulating portion.

The method according to the invention comprises the steps of:

forming a slider material including the substrate, the thin-film magnetic head element and the insulating portion;

forming the first surface in the slider material, by etching a surface of the substrate facing toward the recording medium;

forming the medium facing layer in the slider material so as to be adjacent to the first surface; and forming the medium facing surface in the slider material, by lapping a surface of the medium facing layer facing toward the recording medium a surf ace of the insulating portion facing toward the recording medium.

According to the method of the invention, the medium facing layer is formed, which has a hardness closer to that of the insulating portion as compared with the substrate, and the surface of the medium facing layer facing toward the recording medium and the surface of the insulating portion facing toward the recording medium are lapped to form the medium facing surface. Therefore, the method makes it possible to prevent the occurrence of a difference in level in the medium facing surface due to lapping of the slider material for forming the medium facing surface. In addition, according to the invention, the loads to be applied to the slider material during lapping can be made smaller than in the case of no medium facing layer.

The method of the invention may further comprise the step of forming a concavity/convexity in the medium facing surface to control flying of the slider over the recording medium. In this case, the step of forming the concavity/convexity may be carried out using ion milling, reactive ion etching, or focused ion beam etching.

In the method of the invention, the main material of the insulating portion and the material of the medium facing layer may be the same. In this case, the substrate may be made mainly of aluminum oxide and titanium carbide; the insulating portion may be made mainly of alumina; and the medium facing layer may be made of alumina.

In the method of the invention, the substrate may be made mainly of aluminum oxide and titanium carbide; the insulating portion may be made mainly of alumina; and the medium facing layer may be made of diamond-like carbon.

In the method of the invention, the step of forming the first surface may be carried out using ion milling or reactive ion etching.

In the method of the invention, the step of forming the medium facing layer may be carried out using sputtering or ion beam deposition.

In the method of the invention, the step of forming the medium facing surface may include a step for rough lapping and, a step for fine lapping subsequent thereto. In this case, the thin-film magnetic head element may include a magnetoresistive element for magnetic signal detection; and the step for rough lapping may be carried out while detecting the resistance value of the magnetoresistive element. The rough lapping may be mechanical lapping and the fine lapping may be a lapping including a chemical lapping factor.

Other and further objects, features and advantages of the invention will appear more fully from the following description.

BRIEF DESCRIPTION OF THE DRAWINGS

FIG. 1A and FIG. 1B are cross sections for illustrating a step in an example of a method of manufacturing a thin-film magnetic head element.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 23A and FIG. 23B are cross sections for illustrating a step that follows FIG. 22A and FIG. 22B.

FIG. 24A and FIG. 24B are cross sections of the related-art thin-film magnetic head element.

DETAILED DESCRIPTION OF THE PREFERRED EMBODIMENTS

Figures 6A, 6B:
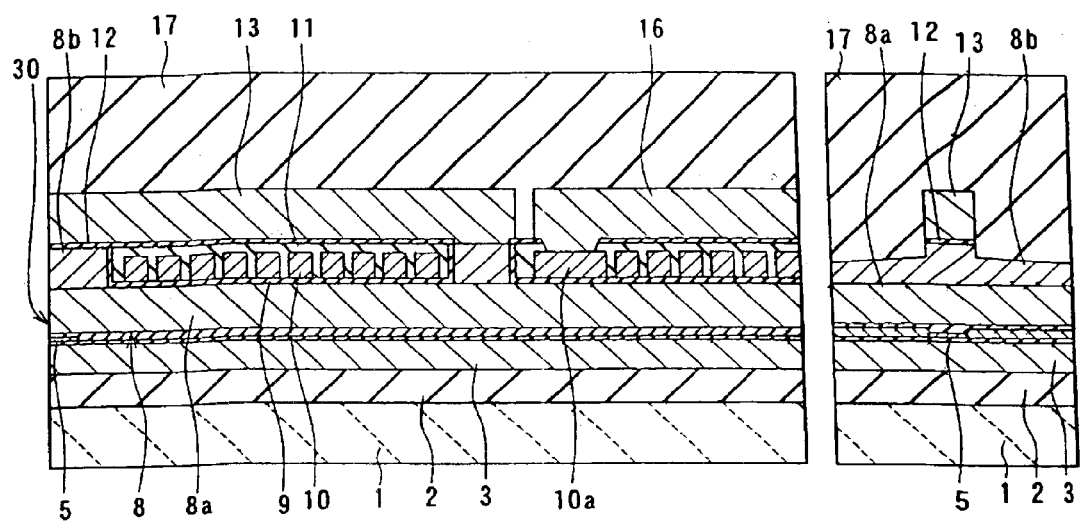
FIG. 6A and FIG. 6B are cross sections for illustrating the configuration of an example of the thin-film magnetic head element.

A preferred embodiment of the invention will now be described in detail with reference to the accompanying drawings.

A slider of a thin-film magnetic head (hereinafter simply called a slider) according to an embodiment of the invention has: an air bearing surface as a medium facing surface that faces toward a recording medium; and a thin-film magnetic head element located near the air bearing surface.

Reference is now made to FIG. 1A to FIG. 6A, FIG. 1B to FIG. 6B, and FIG. 7 to describe an example of a method of manufacturing the thin-film magnetic head element of the slider according to the present embodiment. FIG. 1A to FIG. 6A are cross sections each orthogonal to the air bearing surface and the top surface of the substrate. FIG. 1B to FIG. 6B are cross sections of the pole portion of the head parallel to the air bearing surface.

In the method of this example, as shown in FIG. 1A and FIG. 1B, an insulating layer 2 made of alumina ($Al_2O_3$), for example, of about 5 $\mu$m in thickness is deposited on a substrate 1 made of aluminum oxide and titanium carbide ($Al_2O_3$—TiC), for example. Next, on the insulating layer 2, a bottom shield layer 3, made of a magnetic material such as Permalloy and having a thickness of about 3 $\mu$m, is formed for the reproducing head. The bottom shield layer 3 is selectively formed on the insulating layer 2 through plating with a photoresist film as a mask, for example. Next, although not shown, an insulating layer of alumina for example, is formed to a thickness of 4 to 5 $\mu$m, for example, over the entire surface. The insulating layer is then polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. Next, an MR element 5 for magnetic signal detection is formed to a thickness of tens of nanometers on the bottom shield gap film 4. One of ends of the MR element 5 is located in the air bearing surface 30. The MR element 5 may be formed through selectively etching an MR film formed through sputtering. The MR element 5 may be an element utilizing a magneto-sensitive film that exhibits magnetoresistivity, such as an AMR element, a GMR element or a tunnel magnetoresistive (TMR) element. Next, a pair of electrode layers 6 having a thickness of tens of nanometers are formed on the bottom shield gap film 4. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. The insulating material to be used for the shield gap films 4 and 7 may be alumina, aluminum nitride, or diamond-like: carbon (DLC). The shield gap films 4 and 7 may be formed through sputtering or chemical vapor deposition (CVD).

Next, a first layer 8a of a top-shield-layer-cum-bottom-pole-layer (hereinafter called a bottom pole layer) 8 is selectively formed to a thickness of about 1.0 to 1.5 $\mu$m on the top shield gap film 7. The bottom pole layer 8 is made of a magnetic material and used for both reproducing head and recording head. The bottom pole layer 8 is made up of the first layer 8a, and a second layer 8b and a third layer 8c described later. The first layer 8a is located to face at least a part of a thin-film coil described later.

Next, the second layer 8b and the third layer 8c of the bottom pole layer 8, each having a thickness of about 1.5 to 2.5 $\mu$m, are formed on the first layer 8a. The second layer 8b includes a pole portion of the bottom pole layer 8 and is connected to a surface of the first layer 8a that faces toward a recording gap layer described later (on the upper side of FIG. 2A and FIG. 2A). The third layer 8c is provided for connecting the first layer 8a to a top pole layer described later, and is located near the center of the thin-film coil described later. A portion of the second layer 8b facing the top pole layer has an end located farther from the air bearing surface 30. The position of this end defines the throat height.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 3A and FIG. 3B, an insulating film 9 having a thickness of about 0.3 to 0.6 $\mu$m is formed over the entire surface.

Next, a photoresist is patterned through a photolithography process to form a frame (not shown) used for making the thin-film coil through frame plating. Next, the thin-film coil 10 made of copper (Cu), for example, is formed by frame plating through the use of the frame. For example, the thickness of the coil 10 is about 1.0 to 2.0 μm and the pitch is 1.2 to 2.0 m. The frame is then removed. In the drawings numeral 10a indicates a portion for connecting the coil 10 to a conductive layer (lead) described later.

Next, as shown in FIG. 4A and FIG. 4B, an insulating layer 11 of alumina, for example, having a thickness of about 3 to 4 μm is formed over the entire surface. The insulating layer 11 is then polished through CMP, for example, until the second layer 8b and the third layer 8c of the bottom pole layer 8 are exposed, and the surface is flattened. Although the coil 10 is not exposed in FIG. 4A, the coil 10 may be exposed.

Next, a recording gap layer 12 made of an insulating material is formed to a thickness of 0.2 to 0.3 μm, for example, on the second layer 8b and the third layer 8c of the bottom pole layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD.

Next, a portion of the recording gap layer 12 located on top of the third layer 8c is etched to form a contact hole for making the magnetic path. Portions of the recording gap layer 12 and the insulating layer 11 that are located on top of the connecting portion 10a of the coil 10 are etched to form a contact hole.

Next, as shown in FIG. 5A and FIG. 5B, on the recording gap layer 12, a top pole layer 13 having a thickness of about 2.0 to 3.0 μm is formed in a region extending from the air bearing surface 30 to a portion on top of the third layer 8c of the bottom pole layer 8. At the same time, a conductive layer 16 having a thickness of about 2.0 to 3.0 μm is formed to be connected to the portion 10a of the thin-film coil 10. The top pole layer 13 is in contact with the third layer 8c of the bottom pole layer 8 and magnetically coupled thereto through the contact hole formed in the portion on top of the third layer 8c.

The top pole layer 13 may be made of NiFe (80 weight % Ni and 20 weight % Fe) or a high saturation flux density material such as NiFe (45 weight % Ni and 55 weight % Fe) through plating, or may be made of a material such as FeN or FeZrN as a high saturation flux density material through sputtering. Alternatively, a material such as CoFe or a Co-base amorphous material as a high saturation flux density material may be used. To improve the high frequency characteristic, the top pole layer 13 may be made of a number of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.6 μm through argon ion milling, for example. A trim structure as shown in FIG. 5B is thus formed. The trim structure suppresses an increase in the effective track width due to expansion of a magnetic flux generated during writing in a narrow track.

Next, as shown in FIG. 6A and FIG. 6B, an overcoat layer 17 of alumina, for example, having a thickness of 20 to 40 μm is formed over the entire surface. The surface of the overcoat layer 17 is then flattened and pads (not shown) for electrodes are formed on the overcoat layer 17. Finally, lapping of the slider including the foregoing layers is performed to form the air bearing surface 30 of the recording head and the reproducing head. The thin-film magnetic head element is thus completed.

Figure 7:
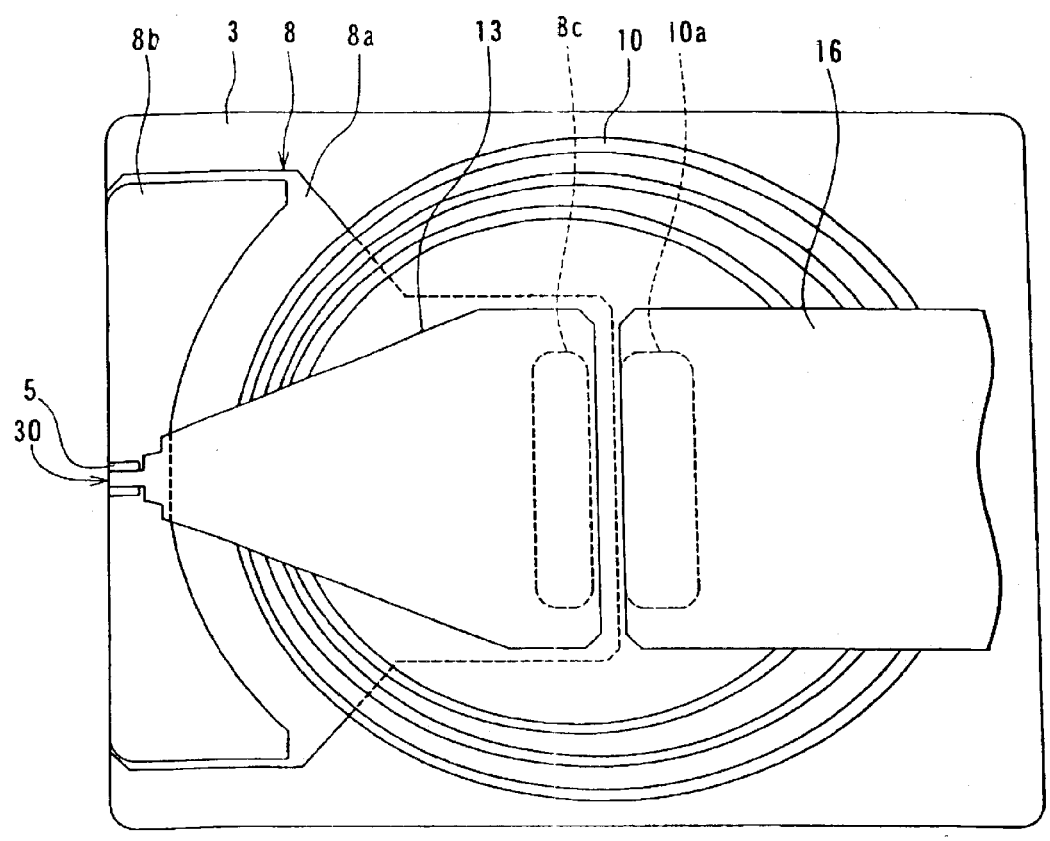
FIG. 7 is a top view of the main part of the thin-film magnetic head element shown in FIG. 6A and FIG. 6B.

FIG. 7 is a top view of the main part of the thin-film magnetic head element shown in FIG. 6A and FIG. 6B, wherein the overcoat layer 17 and the other insulating layers and films are omitted.

The thin-film magnetic head element of this example comprises the reproducing head and the recording head (induction-type electromagnetic transducer). The reproducing head includes the MR element 5 for magnetic signal detection and the bottom shield layer 3 and the top shield layer (bottom pole layer 8) for shielding the MR element 5. Portions of the bottom shield layer 3 and the top shield layer on a side of the medium facing surface that faces toward a recording medium, i.e., air bearing surface 30, are opposed to each other while the MR element 5 is placed between these portions of the bottom shield layer 3 and the top shield layer.

The recording head includes the bottom pole layer 8 and the top pole layer 13 magnetically coupled to each other, each of which includes at least one layer. The bottom pole layer 8 and the top pole layer 13 include pole portions opposed to each other and located in regions on a side of the air bearing surface 30. The recording head further includes: the recording gap layer 12 placed between the pole portion of the bottom pole layer 8 and the pole portion of the top pole layer 13; and the thin-film coil 10 at least a part of which is placed between the bottom pole layer 8 and the top pole layer 13 and is insulated from the bottom pole layer 8 and the top pole layer 13.

Figure 12:
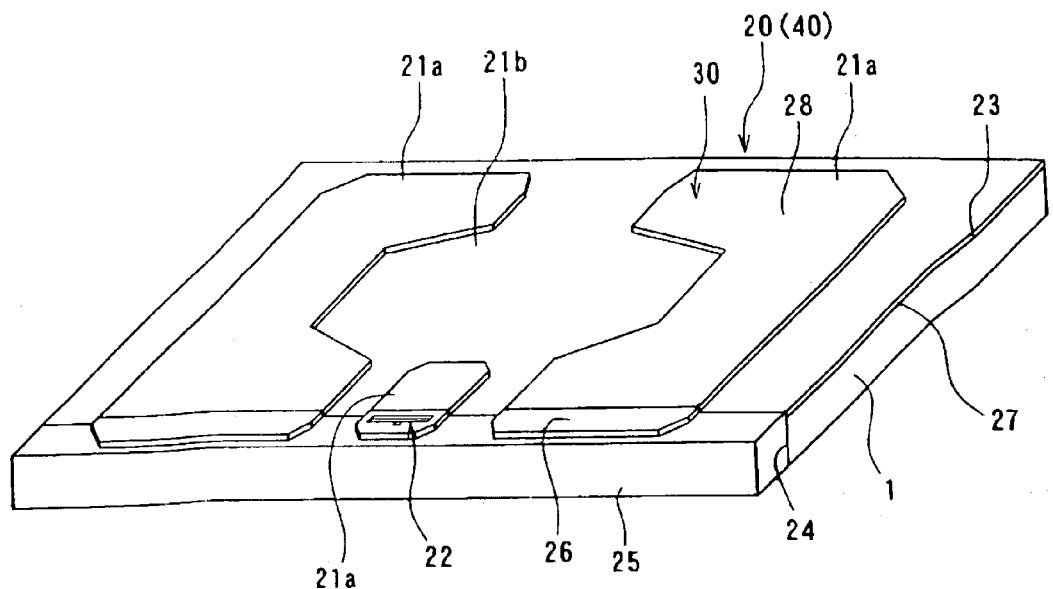
FIG. 12 is a perspective view of a slider according to the embodiment of the invention.
Figure 17:
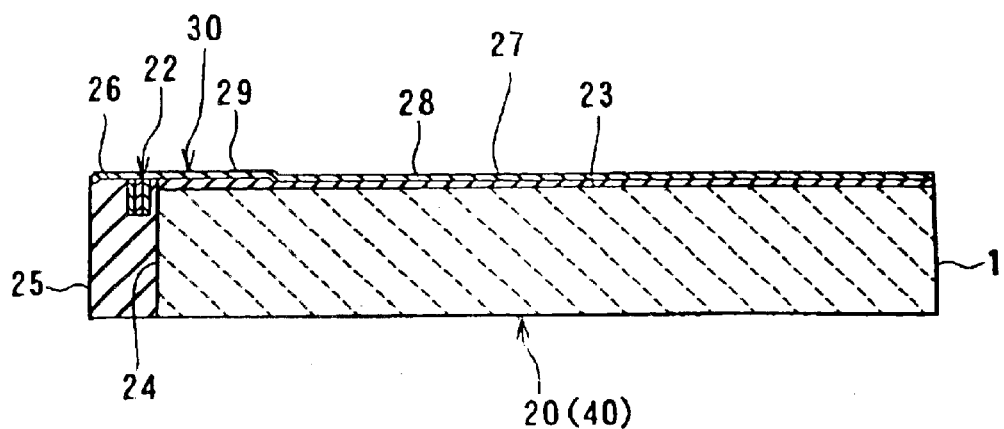
FIG. 17 is a cross section of the slider according to the embodiment of the invention.

Now, description will be given of the configuration of a slider according to the present embodiment. FIG. 12 is a perspective view of the slider according to the present embodiment. FIG. 17 is a cross section of the slider shown in FIG. 12, the section passing through the thin-film magnetic head element and being perpendicular to the air bearing surface.

The air bearing surface 30 of the slider 20 according to the present embodiment is shaped so that the slider 20 slightly flies over the surface of a recording medium such as a magnetic disk by means of airflow generated by the rotation of the recording medium. Specifically, the air bearing surface 30 has a concavity/convexity for controlling the flying of the slider 20 over the recording medium. In FIG. 12, the numeral 21a represents a convex portion and the numeral 21b represents a concave portion. A thin-film magnetic head element 22 is disposed near the air-outflow-side end of the air bearing surface 30 of the slider 20 (the lower side of FIG. 12, the left side of FIG. 17). This thin-film magnetic head element 22 is configured, for example, as shown in FIG. 6A and FIG. 6B.

The slider 20 comprises the substrates, the thin-film magnetic head element 22, an insulating portion 25, and a medium facing layer 27. The substrate 1 has a first surface 23 which faces toward the recording medium and located farther from the recording medium than the air bearing surface 30, and a second surface 24 which meets the first surface 23. The thin-film magnetic head element 22 is located near the second surface 24 of the substrate 1 and near the air bearing surface 30. The insulating portion 25 surrounds the thin-film magnetic head element 22 and has a surface 26 constituting a part of the air bearing surface 30. The medium facing layer 27 is adjacent to the first surface 23 of the substrate 1 and has a surface 28 constituting another part of the air bearing surface 30. The insulating portion 25 is composed mostly of the overcoat layer 17.

The substrate 1 has a hardness greater than that of the insulating portion 25. As the substrate 1 and the medium facing layer 27 are compared in hardness, the medium facing layer 27 has a hardness closer to that of the insulating portion 25. It is preferable that the main material of the insulating portion 25 and the material of the medium facing layer 27 are the same. In this case, the substrate 1 may be made mainly of aluminum oxide and titanium carbide ($Al_2O_3$—TiC); the insulating portion 25 may be made mainly of alumina ($Al_2O_3$); and the medium facing layer 27 may be made of alumina.

Alternatively, the substrate 1 may be made mainly of aluminum oxide and titanium carbide; the insulating portion 25 may be made mainly of alumina, and the medium facing layer 27 may be made of diamond-like carbon.

The material of the medium facing layer 27 is not limited to alumina or diamond-like carbon. The medium facing layer 27 may made of any other insulating material, such as $SiO_2$, or a high resistance material as long as the material has a hardness closer to that of the insulating portion 25 as compared with the substrate 1.

Next, with reference to FIG. 8 to FIG. 17, description will be given of the method of manufacturing a slider according to the present embodiment. Each of FIG. 8 to FIG. 12 is a perspective view for illustrating the method of manufacturing a slider according to the present embodiment. Each of FIG. 13 to FIG. 17 is a cross section for illustrating the method of manufacturing a slider according to the present embodiment. FIG. 13 to FIG. 17 each show a cross section through the thin-film magnetic head element 22, orthogonal to the air bearing surface 30.

Figure 8:
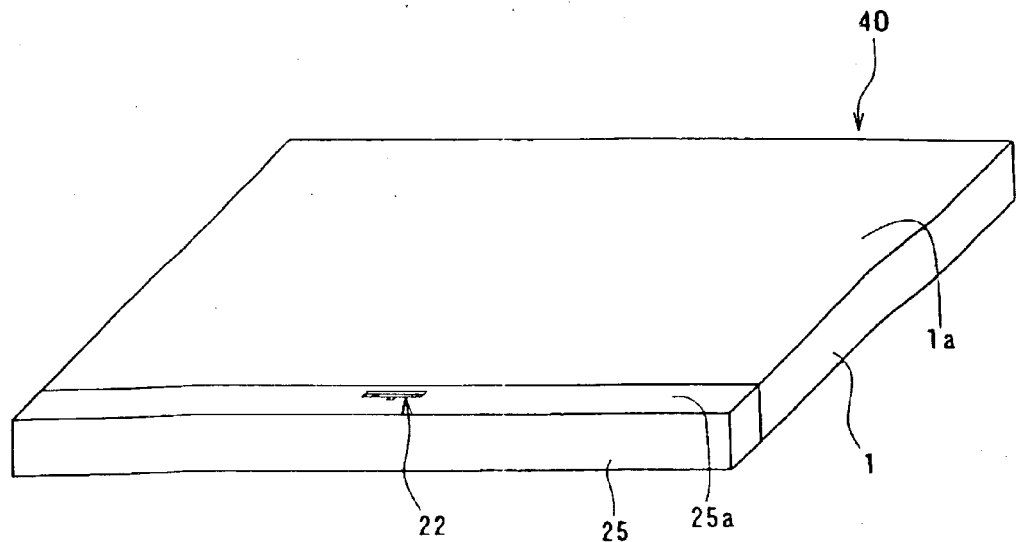
FIG. 8 is a perspective view for illustrating a step in the method of manufacturing a slider according to an embodiment of the invention.
Figure 13:
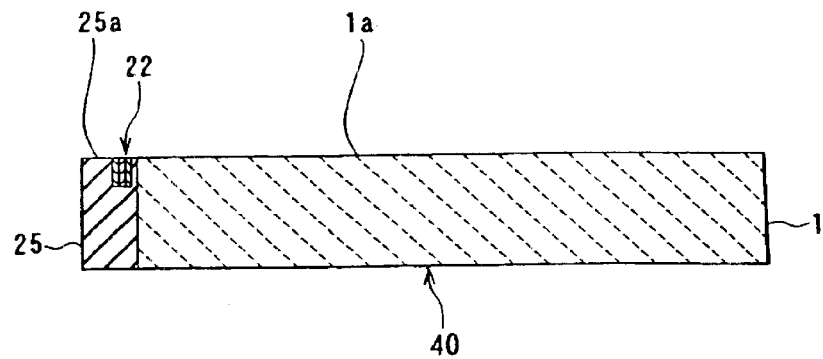
FIG. 13 is a cross section for illustrating a step in the method of manufacturing the slider according to the embodiment of the invention.

In the method of manufacturing a slider according to the present embodiment, a wafer that includes a plurality of rows of portions (hereinafter called slider portions) 40 to be sliders 20, each including the thin film magnetic head element 22, is cut in one direction to form blocks called bars each of which includes a row of slider portions 40. Each bar corresponds to the slider material in the present invention. FIG. 8 and FIG. 13 show only a single slider portion 40 in the bar. As shown in FIG. 8 and FIG. 13, each slider portion 40 includes the substrate 1, the thin-film magnetic head element 22, and the insulating portion 25. At this point, a surface 1a of the substrate 1 that faces toward a recording medium (the surface on the upper side of FIG. 8 and FIG. 13) and a surface 25a of the insulating portion 25 that faces toward a recording medium (the surface on the upper side of FIG. 8 and FIG. 13) are located on the same plane.

Figure 9:
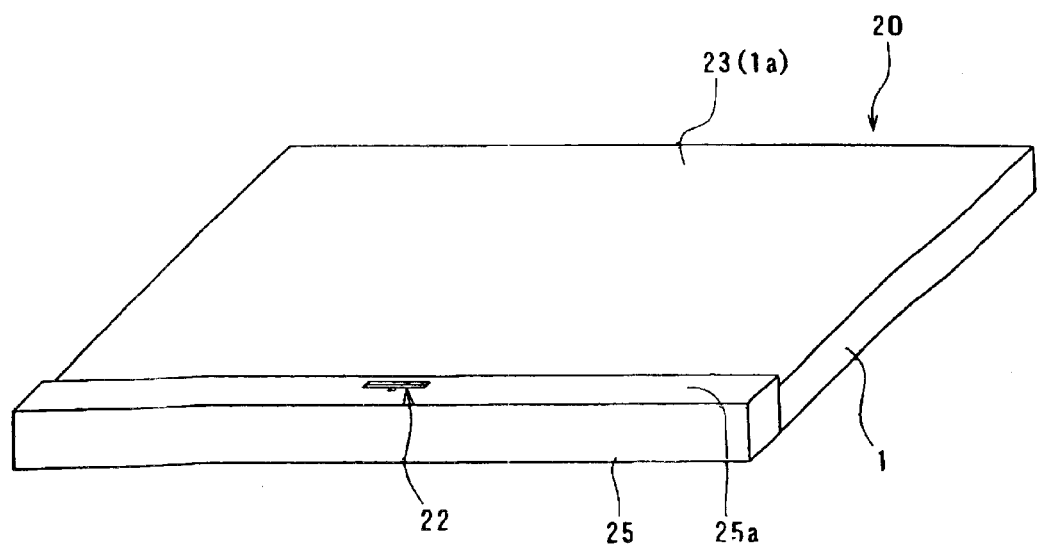
FIG. 9 is a perspective view for illustrating a step that follows FIG. 8.
Figure 14:
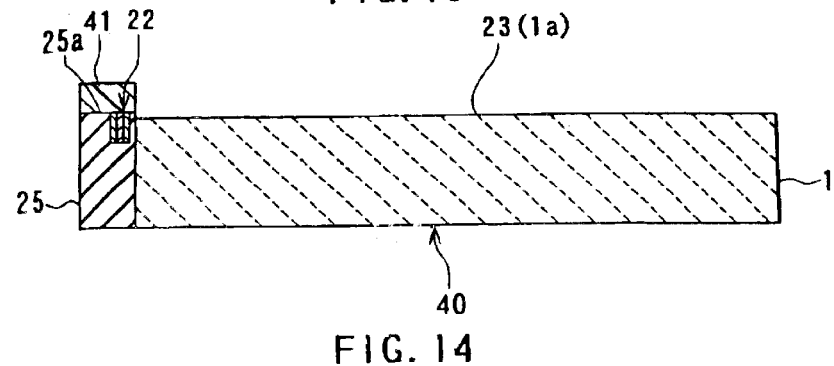
FIG. 14 is a cross section for illustrating a step that follows FIG. 13.

Next, as shown in FIG. 14, a mask 41 made of, for example, a photolithography-patterned photoresist, is formed on the surface 25a of the insulating portion 25 facing toward the recording medium. Then, as shown in FIG. 9 and FIG. 14, the surface 1a of the substrate 1 facing toward the recording medium is etched, preferably through dry etching, by 1 to 3 μm, for example. This etching is performed with reference to the surface 25a of the insulating portion 25 facing toward the recording medium, so that the surface 1a of the substrate 1 that faces toward a recording medium reaches or exceeds the position (depth) of the end of the MR element 5 farther from the air bearing surface 30. The etched surface 1a makes the first surface 23 of the substrate 1. The etching of the substrate 1 is effected, for example, by ion milling or by reactive ion etching (RIE) using such gases as chlorine-based gases including $BCl_2$ and $Cl_2$ and fluorine-based gases including $CF_4$ and $SF_6$.

Figure 10:
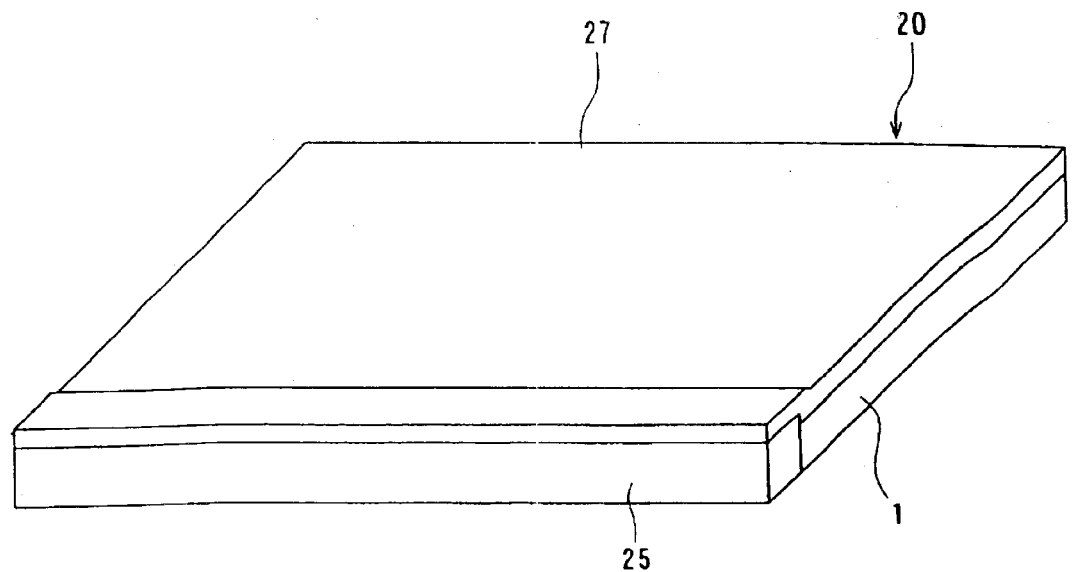
FIG. 10 is a perspective view for illustrating a step that follows FIG. 9.
Figure 15:
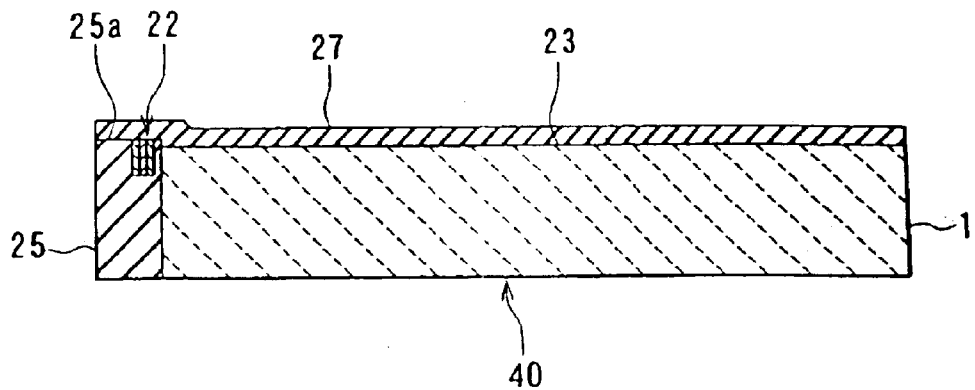
FIG. 15 is a cross section for illustrating a step that follows FIG. 14.

Next, as shown in FIG. 10 and FIG. 15, the medium facing layer 27 having a thickness of, e.g., 1 to 3 μm is formed over the first face 23 of the substrate 1 facing toward the recording medium and the surface 25a of the insulating portion 25 facing toward the recording medium. This medium facing layer 27 is formed by sputtering or ion beam deposition, for example.

Figure 11:
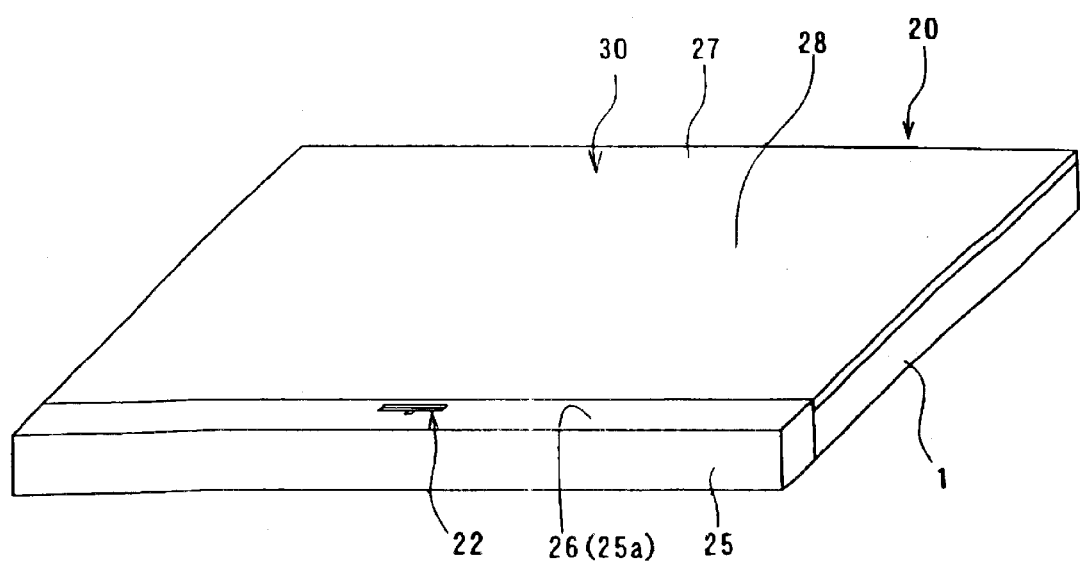
FIG. 11 is a perspective view for illustrating a step that follows FIG. 10.
Figure 16:
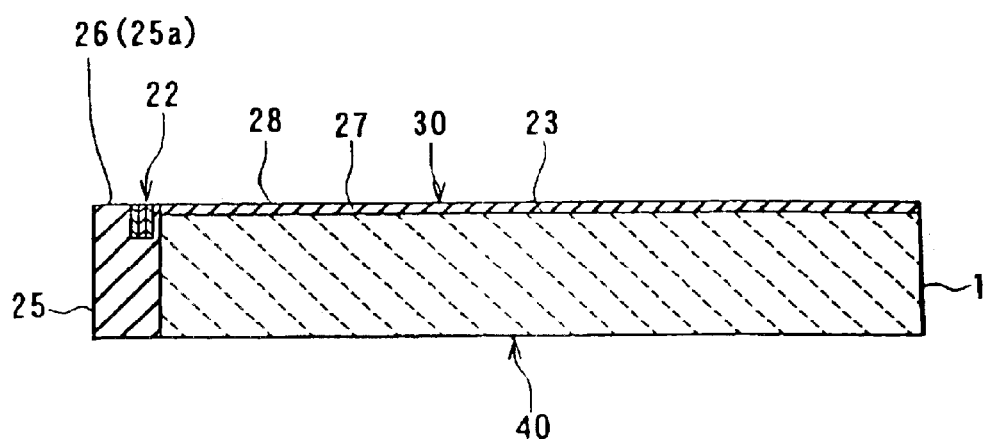
FIG. 16 is a cross section for illustrating a step that follows FIG. 15.

Next, as shown in FIG. 11 and FIG. 16, the surface of the medium facing layer 27 facing toward the recording medium (the surface on the upper side of FIG. 11 and FIG. 16) and the surface 25a of the insulating portion 25 facing toward the recording medium are lapped to formed the air bearing surface 30. Having undergone this step, the surface 25a of the insulating portion 25 becomes the surface 26 that constitutes a part of the air bearing surface 30, and the surface of the medium facing layer 27 that faces toward the recording medium becomes the surface 28 that constitutes another part of the air bearing surface 30.

The step of forming the air bearing surface 30 may include the step of performing a rough lapping of the medium facing layer 27 and the insulating portion 25, and, after this step, the step of performing a fine lapping of the medium facing layer 27 and the insulating portion 25.

In the step for performing the rough lapping, the bar may be lapped while detecting the resistance values of the MR elements 5 in the respective slider portions 40, so that the plurality of slider portions 40 included in the bar become identical in MR height and in throat height.

The rough lapping may be mechanical lapping. The fine lapping may include a chemical lapping factor. For example, the rough lapping may be performed on a rotating tin surface plate, using alkaline slurry made of a diamond abrasive and an alkaline lubricant. In this case, the magnetic layers of the thin-film magnetic head elements 22, the insulating portion 25, and the medium facing layer 27 can be lapped mechanically while the insulating portion 25 and the medium facing layer 27, both made of alumina, are etched chemically with the alkaline slurry. As a result, it is possible to eliminate almost every difference in level among the magnetic layers of the thin-film magnetic head elements 22, the insulating portion 25, and the medium facing layer 27. The fine lapping may be effected by chemical mechanical polishing (CMP), for example.

Next, as shown in FIG. 12 and FIG. 17, the air bearing surface 30 of the slider portion 40 is selectively etched so that convex portions 21a and a concave portion 21b for controlling the flying of the slider 20 over a recording medium are formed on the air bearing surface 30. In this step, the etching of the air bearing surface 30 may be effected by ion milling, reactive ion etching, or focused ion beam etching.

Then, as shown in FIG. 17, a protection film 29 for protecting the thin-film magnetic head element 22 is formed over the entire air bearing surface 30 of the slider portion 40. This protection film 29 may be made of diamond-like carbon, for example. In FIG. 12 the protection film 29 is not shown.

Finally, the bar is cut at between adjacent slider portions 40 into separate sliders 20. In the present embodiment, in the step of forming the convex portions 21a and the concave portion 21b in the air bearing surface 30 of the slider portions 40, each slider portion 40 is chamfered at one of the edges on the side of the air bearing surface 30, the edge lying on the air-outflow side (the left side of FIG. 17), i.e., near the thin-film magnetic head element 22.

Now, with reference to FIG. 18 and FIG. 19, description will be given of an example of a method for lapping a bar while detecting the resistance values of the MR elements 5 in the plurality of slider portions 40 so that the portions 40 included in the bar become identical in MR height and in throat height.

Figure 18:
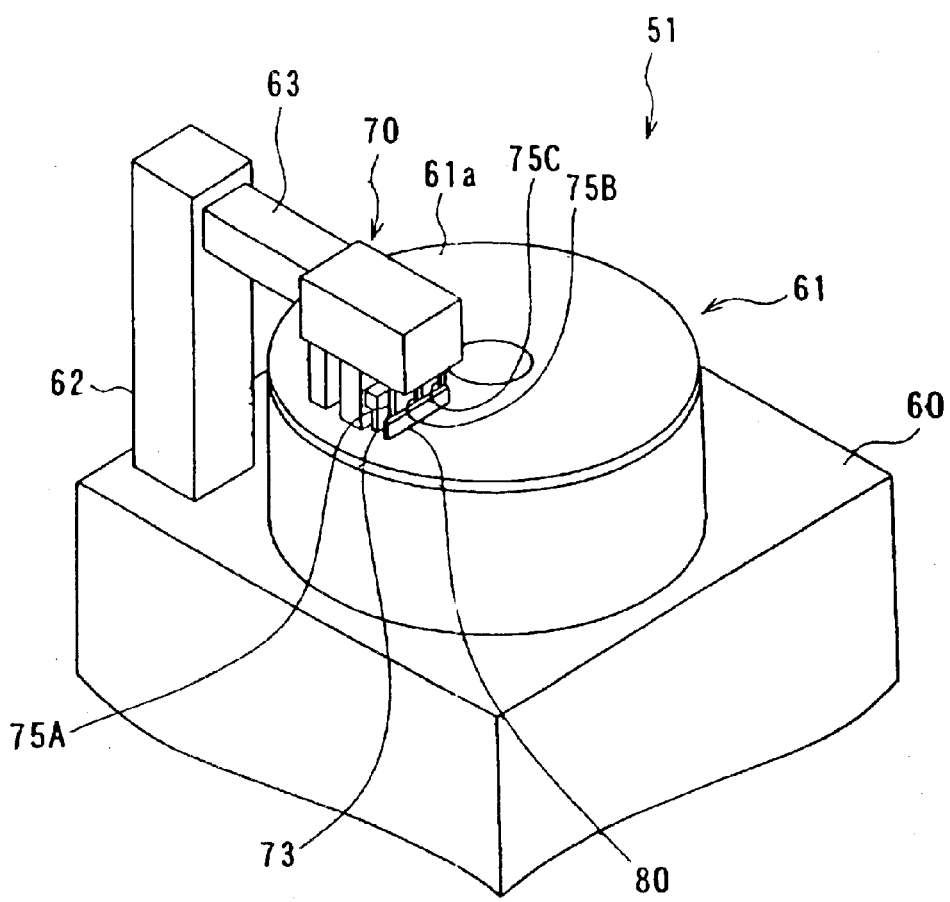
FIG. 18 is a perspective view showing a schematic configuration of a lapping apparatus for lapping a bar in the embodiment of the invention.

FIG. 18 is a perspective view showing a schematic configuration of a lapping apparatus for lapping the bar. This lapping apparatus 51 comprises: a table 60; a rotating lapping table 61 provided on the table 60; a strut 62 provided on the table 60 by the side of the rotating lapping table 61; and a material supporter 70 attached to the strut 62 through an arm 63. The rotating lapping table 61 has a lapping plate 61a to come to contact with the bar.

The material supporter 70 comprises a jig retainer 73 and three load application rods 75A, 75B and 75C placed in front of the jig retainer 73 with specific spacing. A jig 80 is to be fixed to the jig retainer 73. As will be described later in detail, the jig 80 has three load application sections each of which is in the shape of a hole having an oblong cross section. Load application pins are provided at the lower ends of the load application rods 75A, 75B and 75C, respectively. Each of the load application pins has a head to be inserted to each of the load application sections (holes), the head having an oblong cross section. Each of the load application pins is driven by an actuator not shown in the vertical, horizontal (along the length of the jig 80) and rotational directions.

The jig 80 has a retainer for retaining a bar. With this jig 80, the retainer and the bar are deformed by applying loads in various directions to the three load application sections. The air bearing surface 30 of the bar is thereby lapped while the throat heights and MR heights of the thin-film magnetic head elements 22 in the bar are controlled so that the target values are obtained.

Figure 19:
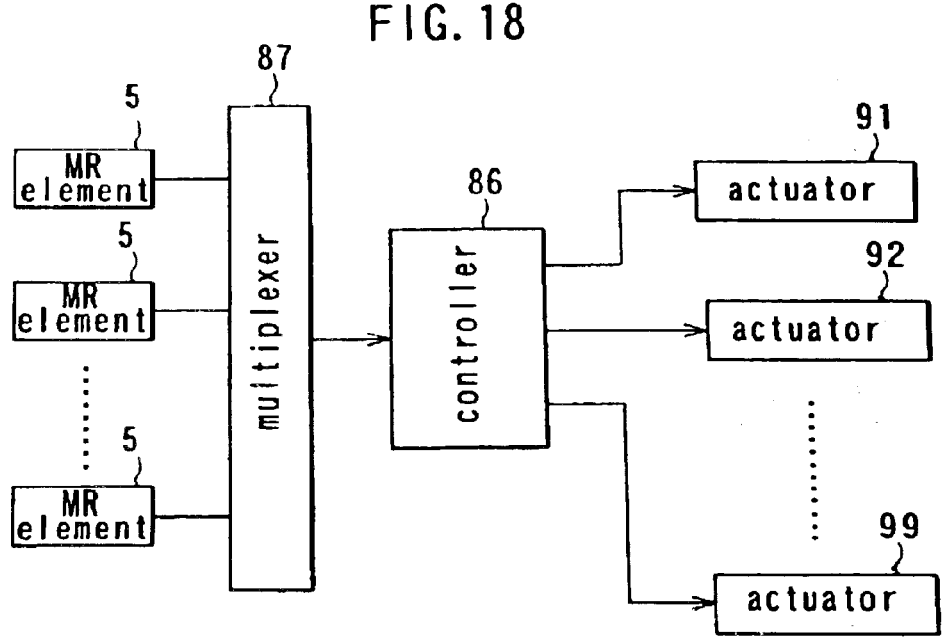
FIG. 19 is a block diagram showing an example of a circuit configuration of the lapping apparatus shown in FIG. 18.

FIG. 19 is a block diagram showing an example of the circuit configuration of the lapping apparatus shown in FIG. 18. This lapping apparatus comprises: nine actuators 91 to 99 for applying loads in the three directions to the load application sections of the jig 80; a controller 86 for controlling the nine actuators 91 to 99 through monitoring the resistance values of a plurality of MR elements 5 in the bar; and a multiplexer 87, connected to the MR elements 5 in the bar through a connector not shown, for selectively connecting one of the MR elements 5 to the controller 86.

In this lapping apparatus, the controller 86 monitors the resistance values of the MR elements 5 in the bar through the multiplexer 87, and controls the actuators 91 to 99 so that throat height and MR height of every thin-film magnetic head element 22 fall within a certain limited tolerance.

As has been described, the slider 20 according to the present embodiment comprises the substrate 1, the thin-film magnetic head element 22, the insulating portion 25, and the medium facing layer 27. The substrate 1 has a hardness greater than that of the insulating portion 25. As the substrate 1 and the medium facing layer 27 are compared in hardness, the medium facing layer 27 has a hardness closer to that of the insulating portion 25.

If there were no medium facing layer 27, the substrate 1 and the insulating portion 25 having different hardnesses would be lapped simultaneously when the bar is lapped for forming the air bearing surface 30. Then, after the lapping, the surface of the insulating portion 25 facing toward the recording medium and the surface of the substrate 1 facing toward the recording medium would have a difference of about the order of, e.g., 4 to 5 nm in level, the surface of the insulating portion 25 being recessed from the surface of the substrate 1.

In contrast, in the slider 20 and the method of manufacturing the same according to the present embodiment, the first surface 23 of the substrate 1 is located father from the recording medium than the air bearing surface 30. The medium facing layer 27 which has a hardness closer to that of the insulating portion 25 as compared with the substrate 1 is provided on this first surface 23. Therefore, according to the present embodiment, it is possible to prevent the air bearing surface 30 from having a difference in level between the insulating portion 25 and the medium facing layer 27 due to the lapping of the bar for forming the air bearing surface 30. In particular, when the main material of the insulating portion 25 is the same as the material of the medium facing layer 27, the above-mentioned difference in level can be eliminated almost completely.

Figure 20:
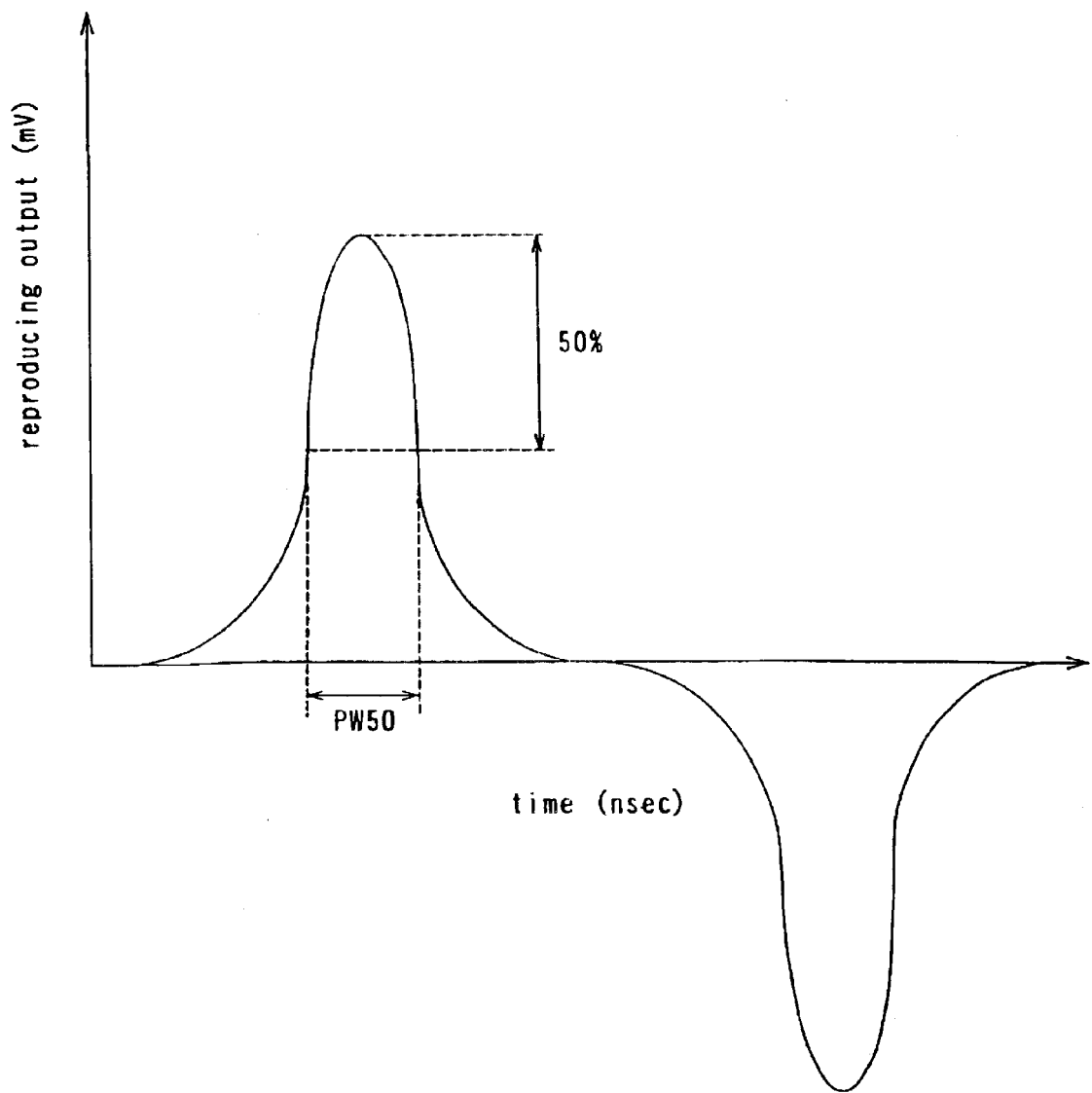
FIG. 20 is a plot for illustrating an example of the waveform of reproducing output of the thin-film magnetic head element of the slider according to the embodiment of the invention.
Figure 21A:
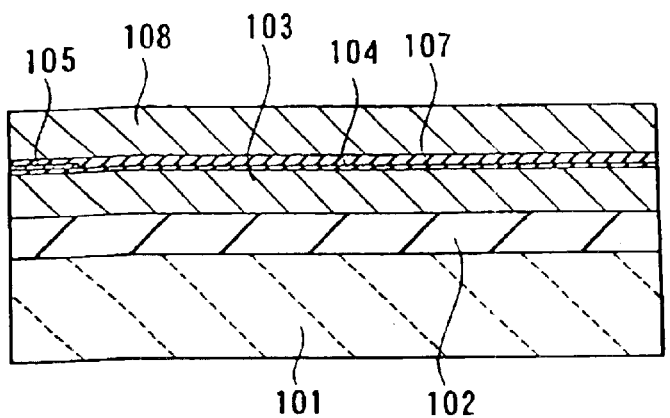
FIG. 21A and FIG. 21B are cross sections for illustrating a step in a method of manufacturing a thin-film magnetic head element of related art.
Figure 21B:
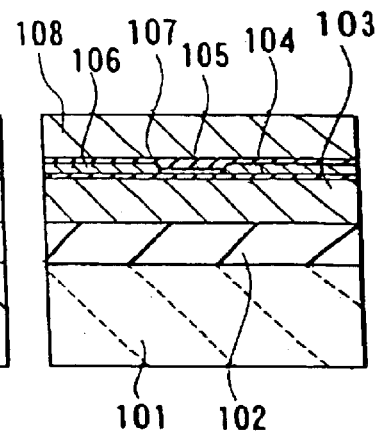
Figure 22A:
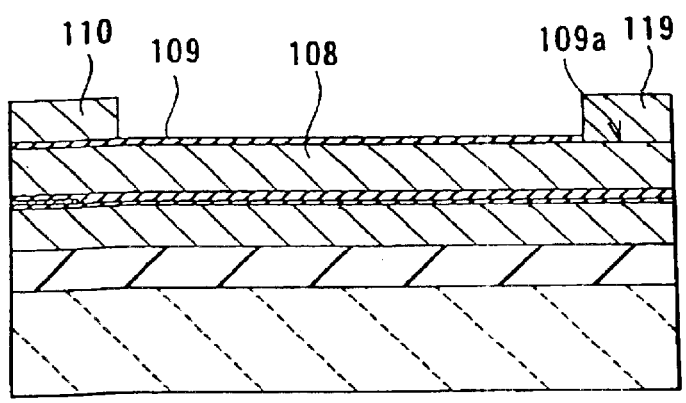
FIG. 22A and FIG. 22B are cross sections for illustrating a step that follows FIG. 21A and FIG. 21B.
Figure 22B:
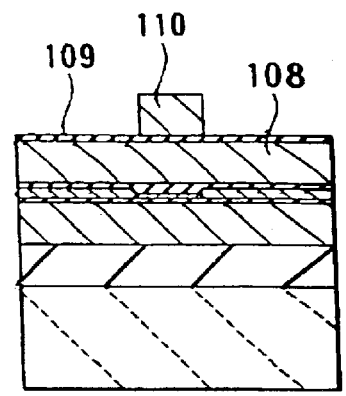
Figure 25:
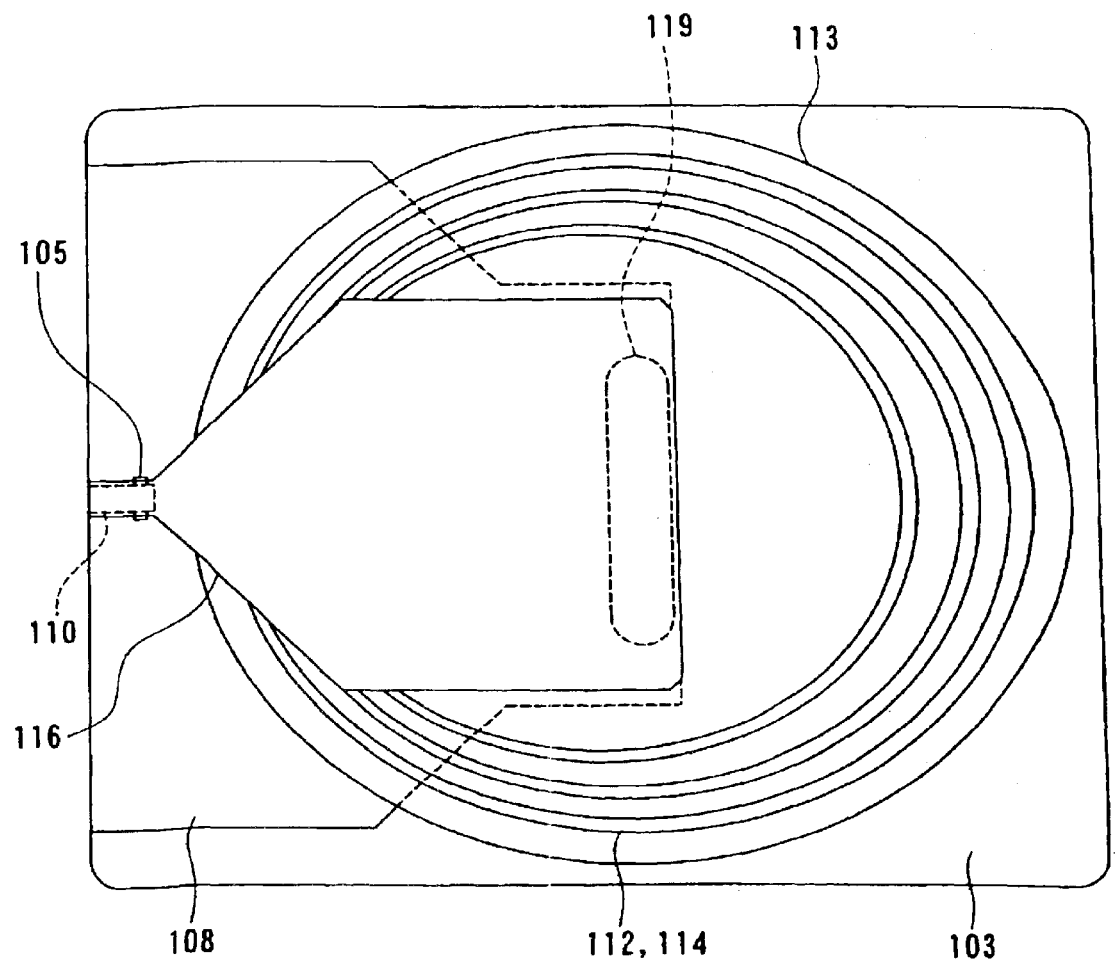
FIG. 25 is a top view of the related-art thin-film magnetic head element.
Figure 26:
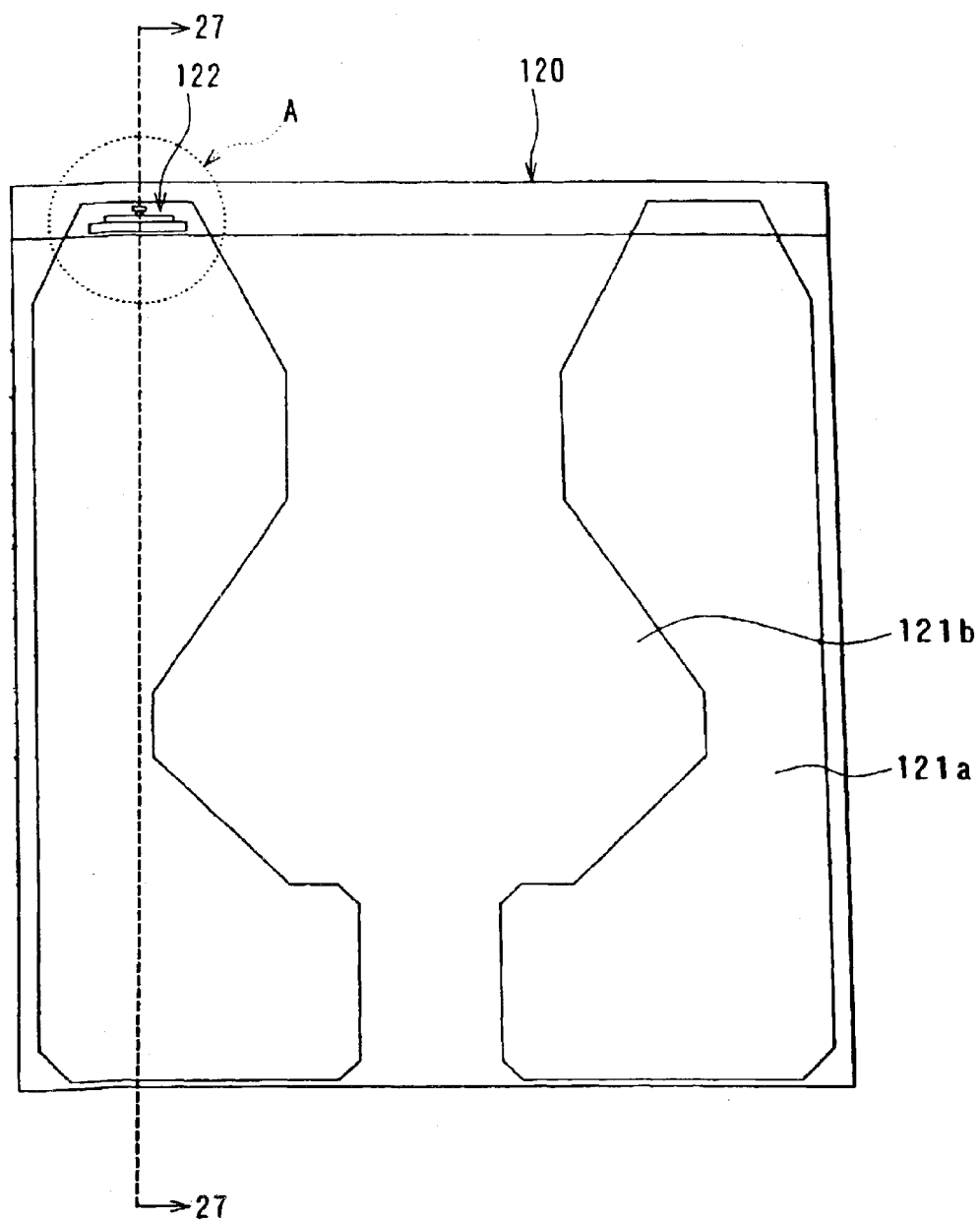
FIG. 26 is a bottom view illustrating an example of the configuration of the air bearing surface of the slider.
Figure 27:
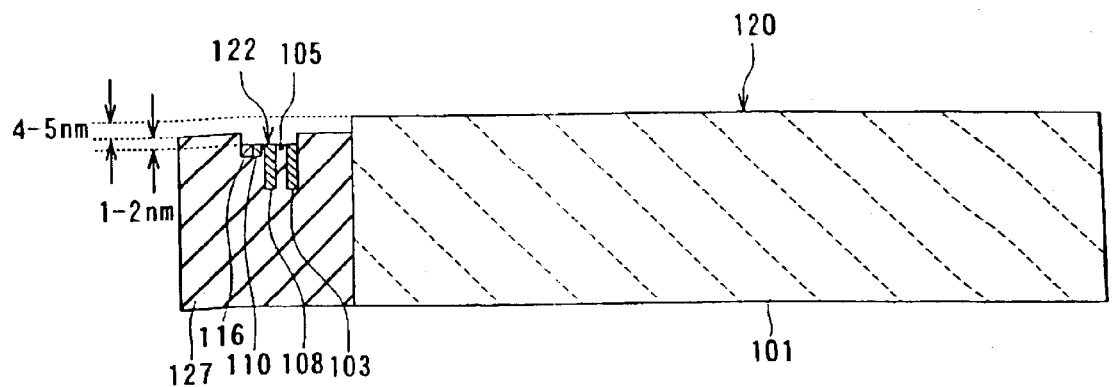
FIG. 27 is a cross section taken along line 27—27 of FIG. 26.
Figure 28:
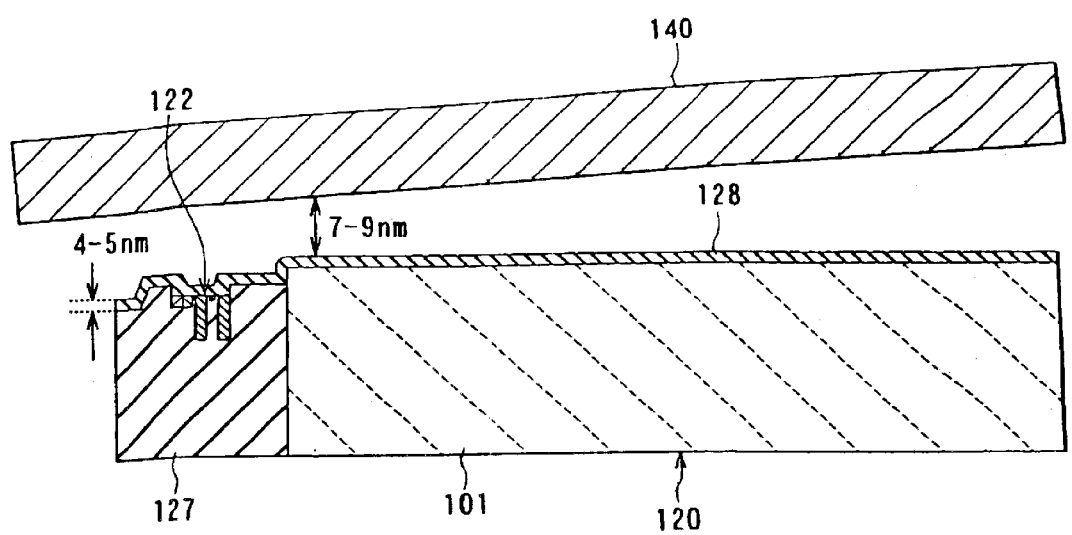
FIG. 28 is a cross section for illustrating the slider slightly flying over the surface of the recording medium.

Therefore, according to the present embodiment, the low-flying slider 20 is achieved, that is, a reduction in the magnetic space is attained. According to the embodiment, the reduction in the magnetic space allows an improvement in the reproducing output and a reduction in half width of the reproducing head. It is thereby possible to improve the recording density. FIG. 20 shows an example of the waveform of reproducing output of the thin-film magnetic head element 22 of the slider 20 of the embodiment. In FIG. 20 'PW50' indicates the half width of the reproducing output. The half width PW50 is the time required for the reproducing output to reach 50 percent or greater of the peak value. Also, according to the embodiment the reduction in the magnetic space achieves an improvement in the overwrite property of the recording head and nonlinear transition shift.

According to the present embodiment, the loads to be applied to a bar during lapping of the bar for forming the air bearing surface 30 can be made smaller than in the case of no medium facing layer 27. As a result, according to the present embodiment, it is possible to prevent occurrences of defects of reproducing heads due to smears caused when lapping the bar.

According to the present embodiment, the lapped surface of the bar is better uniformized in terms of hardness than in the case of no medium facing layer 27. Therefore, according to the present embodiment, the lapping rate becomes almost constant for any portion of the air bearing surface 30, as compared with the case of no medium facing layer 27. As a result, according to the present embodiment, it is possible to improve the air bearing surface 30 in flatness.

The foregoing effects each become particularly significant when the main material of the insulating portion 25 and the material of the medium facing layer 27 are the same.

According to the present embodiment, the air bearing surface 30 of the slider 20 is mostly composed of the medium facing layer 27 which has a hardness smaller than that of the substrate 1. This can reduce the impact that the slider 20 gives the recording medium upon contact with the recording medium. Therefore, according to the present embodiment, it is possible to prevent the recording medium from being damaged when the recording medium changes from rotating to halting and the slider 20 touches the recording medium, or when the slider 20 is brought into contact with the recording medium by external forces.

In the present embodiment, the concavity/convexity for controlling the flying of the slider 20 over the recording medium are formed by etching on the medium facing layer 27 which has a hardness smaller than that of the substrate 1. Therefore, according to the present embodiment, the concavity/convexity can be formed faster and more accurately than in the case of forming the concavity/convexity on the substrate 1 by etching.

The present invention is not limited to the foregoing embodiments but may be practiced instill other ways. For example, the invention may be applied to a thin-film magnetic head dedicated to reading that has no induction-type electromagnetic transducer, a thin-film magnetic head dedicated to writing that has an induction-type electromagnetic transducer only, or a thin-film magnetic head that performs reading and writing with an induction-type electromagnetic transducer.

As has been described, the slider of a thin-film magnetic head of the present invention has the medium facing layer that has a hardness closer to that of the insulating portion as compared with the substrate. Therefore, according to the invention, it is possible to prevent the occurrence of a difference in level in the medium facing surface due to lapping of the slider material for forming the medium facing surface. As a result, according to the invention, it is possible to achieve low-flying sliders of thin-film magnetic heads. In addition, according to the invention, the loads to be applied to the slider material during lapping can be made smaller than in the case of no medium facing layer. Therefore, the present invention makes it possible to prevent occurrences of defects of reproducing heads due to lapping of the slider material for forming the medium facing surface.

In the slider of a thin-film magnetic head of the present invention, the foregoing effects each become significant when the main material of the insulating portion and the material of the medium facing layer are made the same.

In the method of manufacturing a slider of a thin-film magnetic head of the present invention, the medium facing layer having a hardness closer to that of the insulating portion as compared with the substrate is formed, and the surface of the medium facing layer that faces toward a recording medium and the surface of the insulating portion that faces toward a recording medium are lapped to form the medium facing surface. Therefore, according to the invention, it is possible to prevent the occurrence of a difference in level in the medium facing surface due to lapping of the slider material for forming the medium facing surface. As a result, according to the invention, it is possible to achieve low-flying sliders of thin-film magnetic heads. In addition, according to the invention, the loads to be applied to the slider material during lapping can be made smaller than in the case of no medium facing layer. Therefore, the present invention makes it possible to prevent occurrences of defects of reproducing heads due to lapping of the slider material for forming the medium facing surface.

In the method of manufacturing a slider of a thin-film magnetic head of the present invention, the foregoing effects each become significant when the chief material of the insulating portion and the material of the medium facing layer are made the same.

Obviously many modifications and variations of the present invention are possible in the light of the above teachings. It is therefore to be understood that within the scope of the appended claims the invention may be practiced otherwise than as specifically described.

What is claimed is:

1. A slider of a thin-film magnetic head, comprising:

a medium facing surface that faces toward a recording medium;

a substrate having a first surface that faces toward the recording medium and is located farther from the recording medium than the medium facing surface; and a second surface that meets the first surface;

a thin-film magnetic head element located near the second surface of the substrate and near the medium facing surface;

an insulating portion surrounding the thin-film magnetic head element and having a surface that constitutes a part of the medium facing surface; and a medium facing layer located adjacent to the first surface of the substrate and having a surface that constitutes another part of the medium facing surface, wherein:

the first surface of the substrate is located farther from the recording medium than the surface of the insulating portion that constitutes the part of the medium facing surface when the medium facing surface is parallel to the recording medium;

the medium facing layer does not cover the surface of the insulating portion that constitutes the part of the medium facing surface;

the substrate has a hardness greater than that of the insulating portion, and as the substrate and the medium facing layer are compared in hardness, the medium facing layer has a hardness closer to that of the insulating portion.

2. A slider of a thin-film magnetic head according to claim 1, wherein the medium facing surface has a concavity/convexity for controlling flying of the slider over the recording medium.

3. A slider of a thin-film magnetic head according to claim 1, wherein the main material of the insulating portion and the material of the medium facing layer are the same.

4. A slider of a thin-film magnetic head according to claim 3, wherein: the substrate is made mainly of aluminum oxide and titanium carbide; the insulating portion is made mainly of alumina; and the medium facing layer is made of alumina.

5. A slider of a thin-film magnetic head according to claim 1, wherein: the substrate is made mainly of aluminum oxide and titanium carbide; the insulating portion is made mainly of alumina; and the medium facing layer is made of diamond-like carbon.

* * * * *

UNITED STATES PATENT AND TRADEMARK OFFICE
CERTIFICATE OF CORRECTION

PATENT NO. : 6,958,888 B2
DATED : October 25, 2005
INVENTOR(S) : Yoshitaka Sasaki and Takehiro Kamigama It is certified that error appears in the above-identified patent and that said Letters Patent is hereby corrected as shown below:

<u>Title page,</u>
Item [73], Assignee, change "SAE Magnetic (H.K.), Ltd.," to -- SAE Magnetics (H.K.) Ltd., --.

Signed and Sealed this

Fourth Day of April, 2006

JON W. DUDAS
*Director of the United States Patent and Trademark Office*